(12) United States Patent
Hu et al.

(10) Patent No.: US 9,262,844 B2
(45) Date of Patent: Feb. 16, 2016

(54) METHOD TO COMPENSATE GATING EFFECTS ON IMAGE UNIFORMITY AND QUANTIFICATION FOR PET SCAN WITH CONTINUOUS BED MOTION

(71) Applicant: Siemens Medical Solutions USA, Inc., Malvern, PA (US)

(72) Inventors: Jicun Hu, Knoxville, TN (US); Vladimir Y. Panin, Knoxville, TN (US); Frank Kehren, Knoxville, TN (US); Michael E. Casey, Louisville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 14/671,407

(22) Filed: Mar. 27, 2015

(65) Prior Publication Data

US 2015/0302613 A1 Oct. 22, 2015

Related U.S. Application Data

(60) Provisional application No. 61/980,129, filed on Apr. 16, 2014.

(51) Int. Cl.
*G06K 9/00* (2006.01)
*G06T 11/00* (2006.01)
*G06T 7/00* (2006.01)

(52) U.S. Cl.
CPC ............. *G06T 11/003* (2013.01); *G06T 7/0024* (2013.01); *G06T 2207/10004* (2013.01); *G06T 2207/10072* (2013.01); *G06T 2207/10104* (2013.01)

(58) Field of Classification Search
CPC .......... G06T 2207/10104; G06T 2207/10108; G06T 2207/10072; G06T 7/0012; G06T 2207/30004; A61B 6/037; A61B 6/5211; A61B 6/5206; A61B 2576/00
See application file for complete search history.

(56) References Cited

U.S. PATENT DOCUMENTS

| | | | |
|---|---|---|---|
| 6,490,476 B1 * | 12/2002 | Townsend | A61B 6/032 250/363.03 |
| 2005/0253074 A1 * | 11/2005 | Jones | G01T 1/2985 250/363.04 |
| 2012/0281897 A1 | 11/2012 | Razifar et al. | |
| 2014/0194735 A1 * | 7/2014 | Panin | G06T 11/005 600/425 |
| 2014/0200848 A1 * | 7/2014 | Panin | A61B 6/037 702/179 |
| 2015/0036789 A1 * | 2/2015 | Panin | A61B 6/5235 378/4 |

OTHER PUBLICATIONS

Panin et al ("Normalization coefficient Computing for continuous bed motion acquisition", Nov. 2013).*

(Continued)

*Primary Examiner* — Avinash Yentrapati
(74) *Attorney, Agent, or Firm* — Peter Kendall

(57) ABSTRACT

Methods and systems for processing data for medical imaging are disclosed. The method includes obtaining a set of continuous bed motion (CBM) data from a first imaging modality. The set of CBM data includes a plurality of gating signals. A CBM normalization matrix is calculated. The CBM normalization matrix calculation includes the plurality of gating signals. An image is reconstructed from the CBM data and the CBM normalization matrix. The first imaging modality can be a PET imaging device.

16 Claims, 11 Drawing Sheets

(56) References Cited

OTHER PUBLICATIONS

Jones et al ("Beyond List Mode: On-Line Rebinning and Histogramming for Continuous Bed Motion in Clinical Whole Body TOF PET/CT", 2010).*

V. Y. Panin, A. M. Smith, J. Hu, F. Kehren and M. E. Casey, "Continuous bed motion on clinical scanner: design, data correction, and reconstruction," Physics in Medicine and Biology., vol. 59, pp. 6153-6174, 2014.

M.E. Casey, H. Gadagkar, and D. Newport "A component based method for normalization in volume PET" Proc. of the 1995 International Meeting on Fully Three-Dimensional Image Reconstruction in Radiology and Nuclear Medicine (Aix-les-Bains, France) pp. 67-71, 1995.

W. Elmpt, J. Hamill, J. Jones, D. Ruysscher, P. Lambin and M. Öllers, "Optimal gating compared to 3D and 4D PET reconstruction for characterization of lung tumours," Eur J Nucl Med Mol Imaging vol. 38, pp. 843-855, 2011.

* cited by examiner

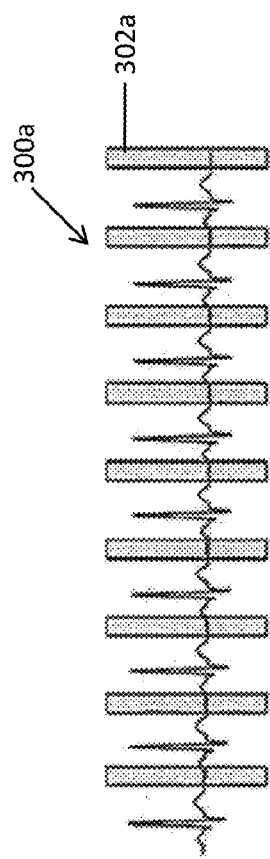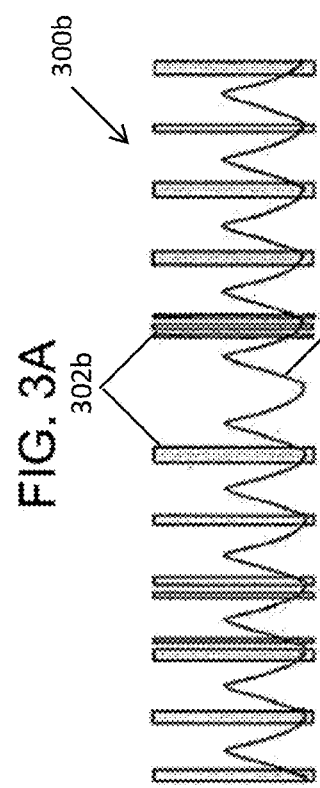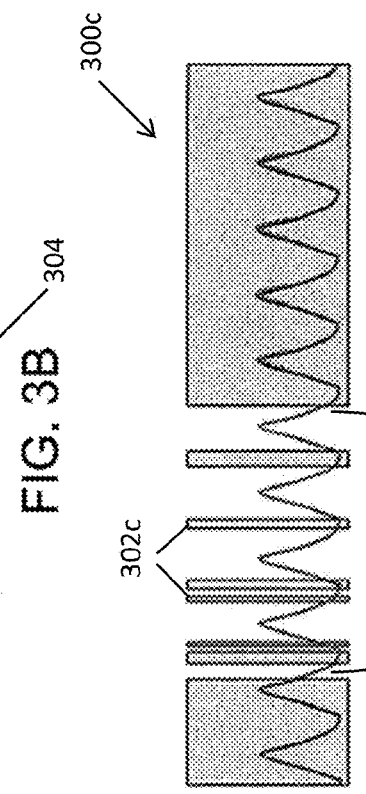

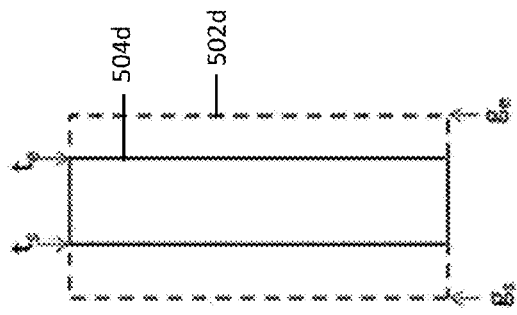
FIG. 5D
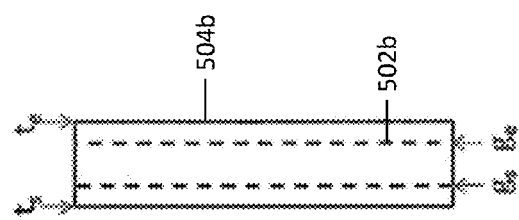
FIG. 5C
FIG. 5B
FIG. 5A

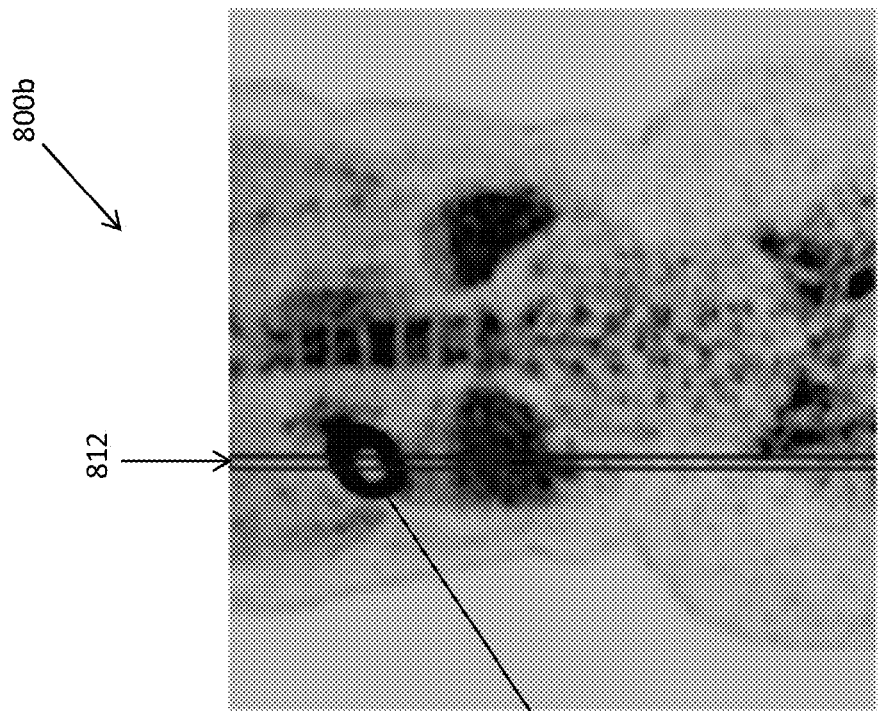
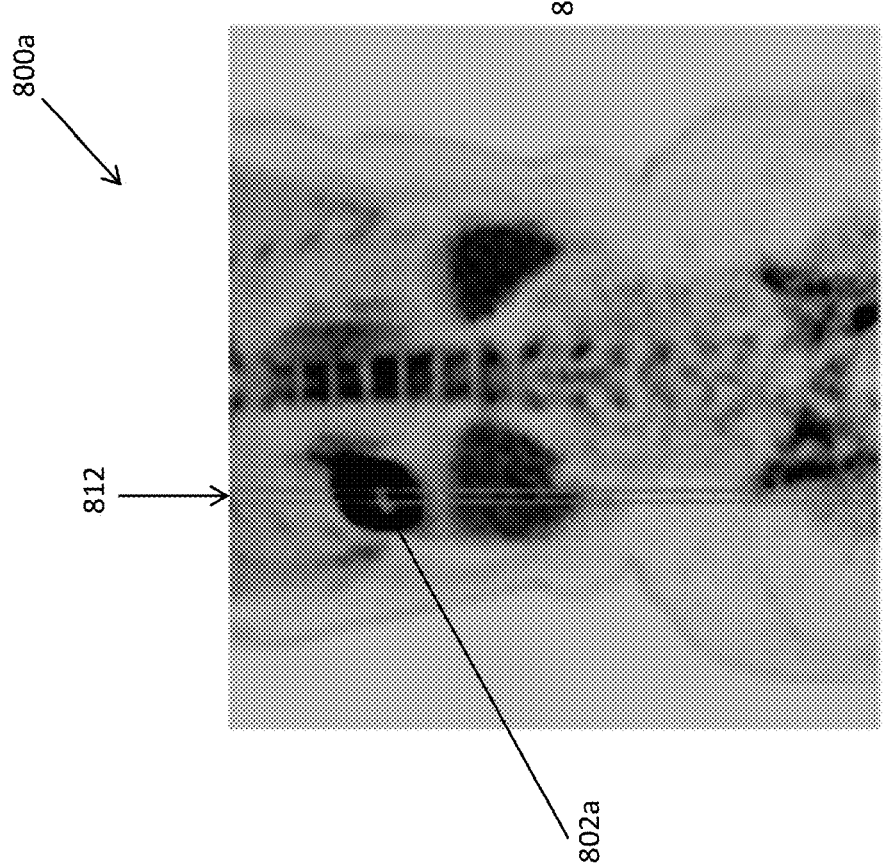
FIG. 8B
FIG. 8A

METHOD TO COMPENSATE GATING EFFECTS ON IMAGE UNIFORMITY AND QUANTIFICATION FOR PET SCAN WITH CONTINUOUS BED MOTION

CROSS-REFERENCE TO RELATED APPLICATIONS

This application claims priority under 35 U.S.C. §119(e) from U.S. Provisional Application Ser. No. 61/980,129, filed on Apr. 16, 2014, the entirety of which is incorporated by reference herein.

FIELD

Aspects of the present disclosure relate in general to processing data for medical imaging, and more particularly to techniques for compensating gating effects on image uniformity and quantifications for imaging scans with continuous bed motion.

BACKGROUND

Positron emission tomography (PET) scanning employs a gamma-emitting radiopharmaceutical ingested by a patient or injected into a patient. Multiple gamma ray images are taken in multiple directions to generate a 3-dimensional PET image and/or multiple slices of a PET image. PET scanning generally provides useful information regarding the functional condition of the body tissues and systems such as the cardiovascular system, respiratory system, and/or other systems. PET scanning is useful for indicating the presence of soft tissue tumors or decreased blood flow to certain organs or areas of the body. During operating, image quality of a PET scan can be affected by motion during imaging, for example, respiratory and/or cardiovascular motion. Imaging artifacts may be generated during acquisition because of body motion. PET scans can require a relatively long duration data acquisition period, on the order of several minutes (e.g., about 30 minutes per image) for a typical clinically sufficient image. Typically, a large number of PET data acquisitions (e.g., frames) are acquired at multiple bed positions during the imaging period. Consequently, patient movement is a problem in PET scanning.

PET scanning has a limited field of view (FOV) and cannot capture whole body images. In conventional systems, in order to perform whole body imaging, multiple PET images are captured at multiple positions with respect to a patient (e.g., beds). The multiple images are obtained by a "step and shoot" method. FIG. 1 illustrates one embodiment of a step and shoot PET scan. In the step and shoot method, the PET scanner 100 is positioned at multiple, discrete bed locations and an image is obtained at each bed. The counts of each line of response (LOR) 104a, 104b in the obtained sinogram are an integration of signals over a single crystal pair 106a, 106b. Different LORs 104a, 104b see the same gating windows. The multiple images are stitched together to form a single, whole body image. A gating profile may be used to reduce image blur because of movement.

Recent systems have employed a continuous bed motion (CBM) method to obtain whole body images. FIG. 1 further illustrates one embodiment of a CBM PET scan. In CBM systems, the PET scanner 100 is moved from a start position, for example, at the head of a patient, to an end position, for example, the feet of a patient, at a constant rate. PET data is collected continuously from the start position to the end position. CBM data acquisition is more natural for patient whole body scan and provides more flexibility in data processing. However, CBM data acquisition complicates normalization for cardiac/respiratory gating protocols, which are commonly used to reduce motion artifacts in PET scans. In CBM scanning, counts are established for virtual LORs 110a, 110b. The count for each virtual LOR is an integration of multiple real LORs 104a, 104b. Each virtual LOR 110a, 110b receives contributions from different gating windows, complicating normalization.

If gating effects are not accounted for properly, image non-uniformity and wrong quantification will occur. For step and shoot scans, counts acquired on LORs can be regarded as integrations of counts on the same crystal pair over time. Gating windows will act on LORs of all sinogram planes simultaneously. In CBM scans, data corresponding to virtual LORs 110a, 110b of a sinogram chunk are integrations of counts acquired by spatially distant detector pairs. Different virtual LORs 110a, 110b in a sinogram chunk will have contributions from counts detected in different sets of gating windows. Simple scaling methods, as used in step and shoot scans, do not properly account for gating effects on reconstructions of CBM sinograms.

SUMMARY

In various embodiments, a method for processing data for medical imaging is disclosed. The method comprises obtaining a set of continuous bed motion (CBM) data from a first imaging modality. The set of CBM data includes a plurality of gating signals. A CBM normalization matrix is calculated using the plurality of gating signals. An image is reconstructed from the CBM data and the CBM normalization matrix.

In various embodiments, a non-transitory computer readable medium storing instructions is disclosed. The instructions are configured to cause a computer system to execute the steps of obtaining a set of continuous bed motion (CBM) data including a plurality of gating signals, calculating a CBM normalization matrix using the plurality of gating signals, and reconstructing an image from the CBM data and the CBM normalization matrix. The set of continuous bed motion data is obtained by a first imaging modality of an imaging system.

In various embodiments, a system is disclosed. The system comprises a first imaging modality and a computer. The computer is configured to receive a set of continuous bed motion (CBM) data including a plurality of gating signals from the first imaging modality, calculate a CBM normalization matrix using the plurality of gating signals, and reconstruct an image from the CBM data and the CBM normalization matrix.

BRIEF DESCRIPTION OF THE DRAWINGS

The following will be apparent from elements of the figures, which are provided for illustrative purposes and are not necessarily to scale.

FIG. 3A illustrates one embodiment of a cardiac gating profile.

FIG. 3B illustrates one embodiment of a respiratory gating profile.

FIG. 3C illustrates one embodiment of a stitched chest gating profile.

FIGS. 5A-5D illustrate various embodiments of an intersection between a gating window and a timing window.

FIG. 8A illustrates one embodiment of a static reconstructed image utilizing 100% of counts obtained in the CBM imaging data.

FIG. 8B illustrates one embodiment of a gated image constructed according to the methods herein.

DETAILED DESCRIPTION

This description of the exemplary embodiments is intended to be read in connection with the accompanying drawings, which are to be considered part of the entire written description.

Various embodiments of the present disclosure address the foregoing challenges associated with continuous bed motion imaging, e.g., by leveraging the technique of gating in new ways with intelligent processing of gate data.

Figure 1A:
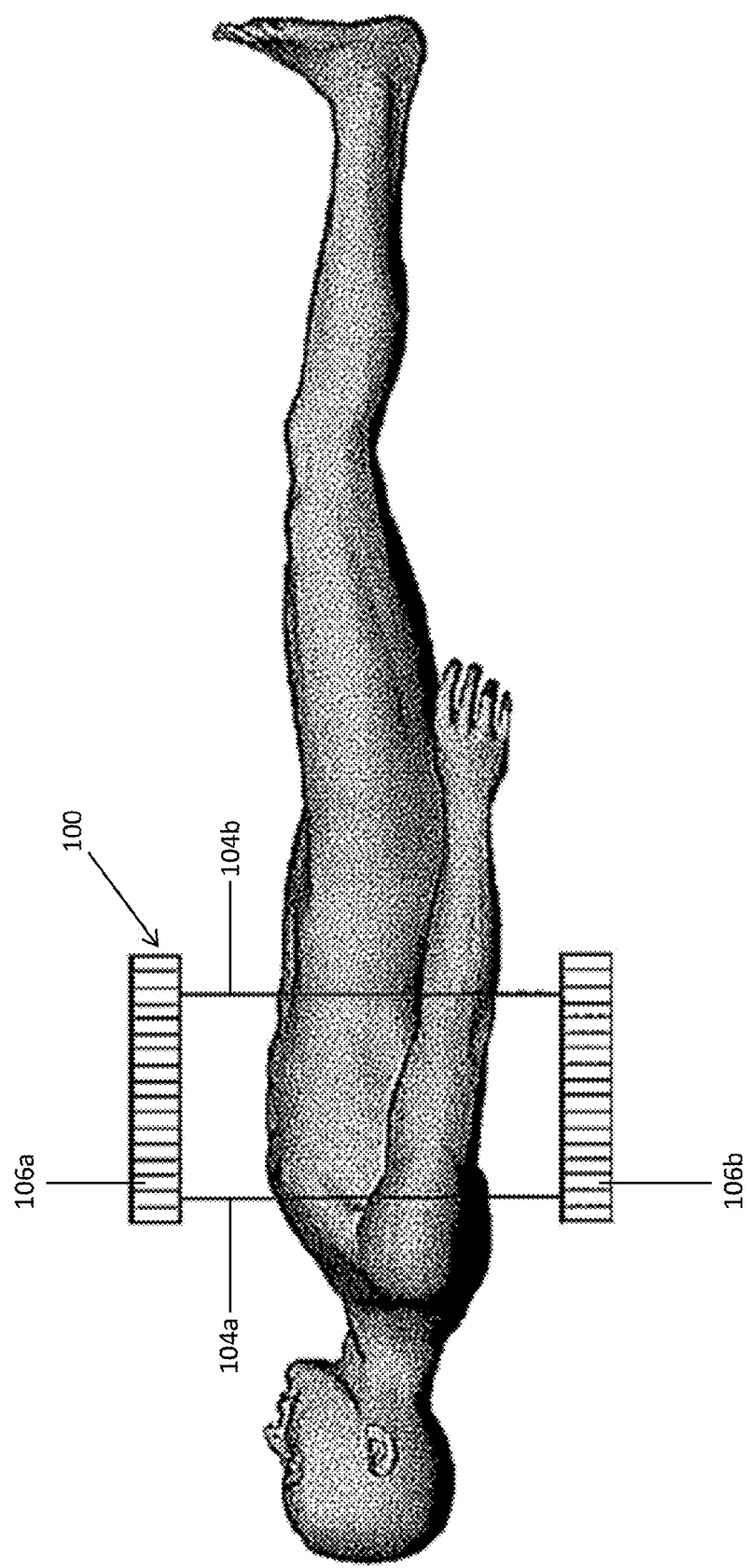
FIG. 1A illustrates one embodiment of a step-and-shoot scanning system.
Figure 1B:
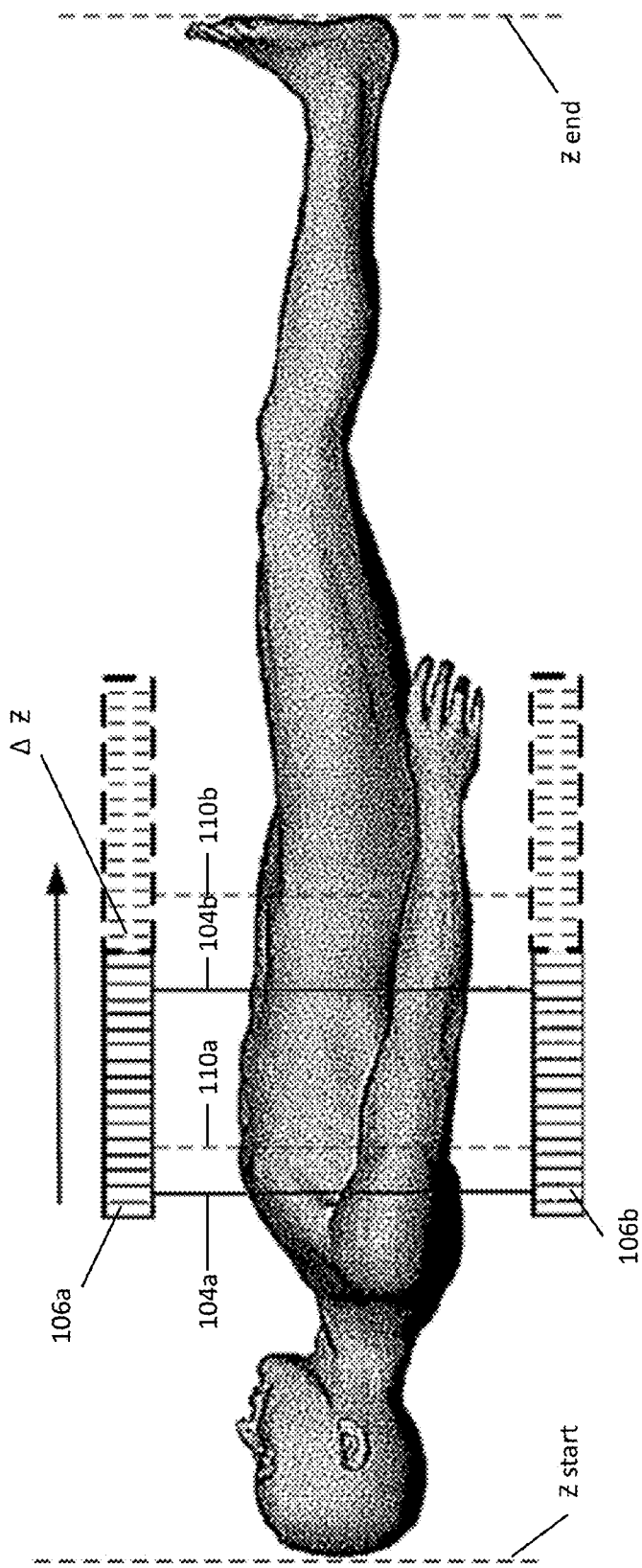
FIG. 1B illustrates one embodiment of a CBM scanning system.
Figure 2:
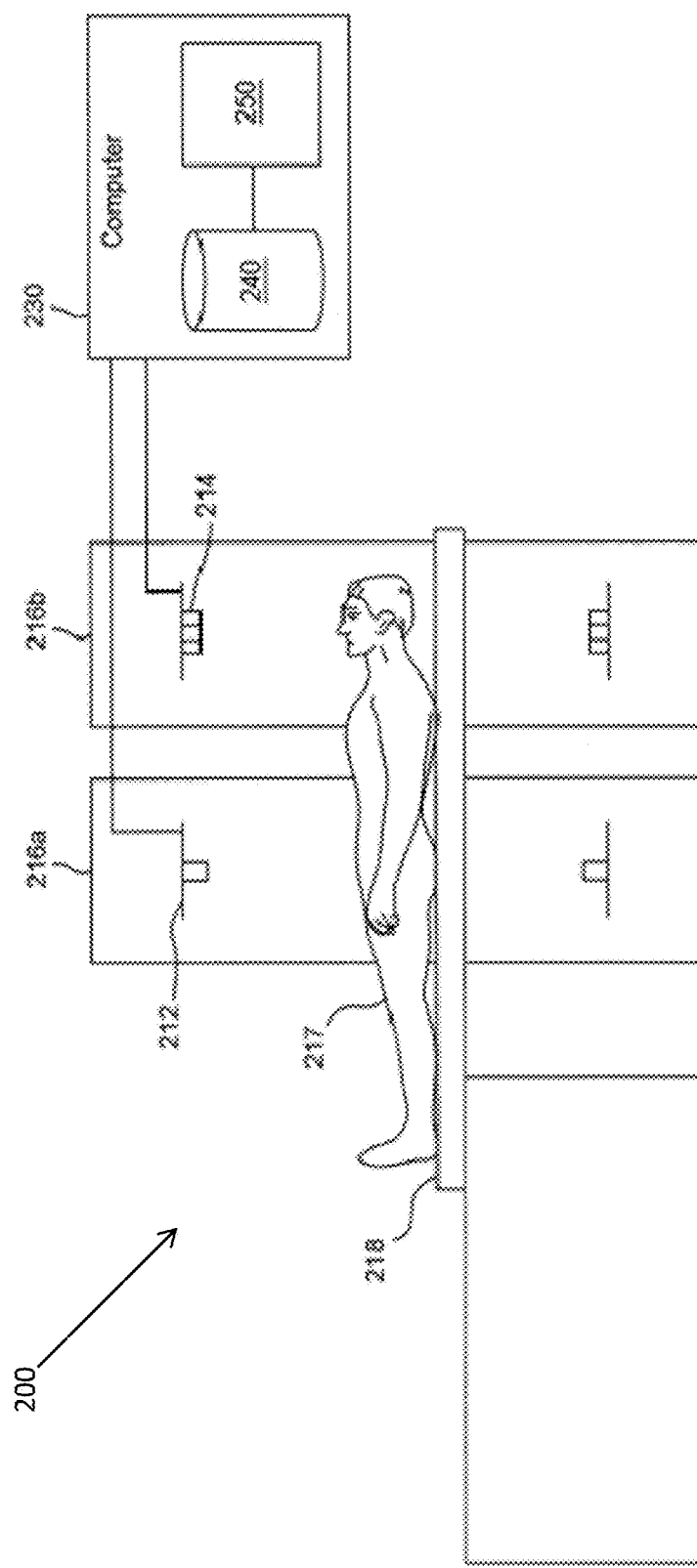
FIG. 2 illustrates one embodiment of an imaging system.

FIG. 2 illustrates one embodiment of an imaging apparatus 200. The imaging apparatus 200 is configured for one or more imaging modalities, such as, for example, PET imaging, either alone and/or in combination with one or more additional imaging modalities. The imaging apparatus 200 includes a scanner for at least a first imaging modality 212 provided in a gantry 216a. In some embodiments, the imaging apparatus 200 includes a scanner for at least a second imaging modality 214 provided in a second gantry 216b. In various embodiments, the first imaging modality 212 is a PET imaging modality. The second imaging modality 214 may comprise any suitable imaging modality, such as, for example, Computed Tomography (CT), Magnetic Resonance (MR), single photon emission computed tomography (SPECT), and/or any other suitable secondary imaging modality. A patient 217 lies on a movable patient bed 218 that may be movable between a first position and a second position. Alternatively, in some embodiments, the patient bed 218 is stationary and at least the first gantry 216a is moveable.

Scan data from at least the first imaging modality 212 is stored at one or more computer databases 240 and processed by one or more computer processors 250 of a computer 230. The graphical depiction of computer 230 in FIG. 2 is provided by way of illustration only, and computer 230 may include one or more separate computing devices. In some embodiments, the computer 230 is configured to generate a whole body image from a PET data set acquired by the first imaging modality 212. The PET data set comprises CBM PET data. In some embodiments, the CBM PET data is provided to the computer 230 from memory coupled to the computer 230.

In some embodiments, gating of the CBM data is performed based on acquired physiological signals to determine gate locations (in time) and a width (in time duration) for the gates. Any gating algorithm known in the art can be used for this purpose. Gate width (the time duration of a gate) of respective gates in a cycle may be constant or may vary, e.g., depending on the gating algorithm that is used and the constraints of the imaging modality.

In some embodiments, the PET imaging modality 212 has a predetermined FOV. The FOV determines a width of an image obtainable by the PET imaging modality 212. In some embodiments, the FOV of the PET imaging modality 212 is insufficient to capture a whole body image in a single position. For example, in some embodiments, the FOV of the PET imaging modality 212 may be about 25 cm, about 16 cm, and/or any other suitable PET imaging FOV. In order to capture a whole body image, the imaging apparatus 200 applies a CBM scanning method. The imaging apparatus 200 moves the patient bed 218 from a first, or start, position to a second, or end, position. In some embodiments, the patient bed 218 moves at a constant speed. The PET imaging modality 212 captures a PET data from a fixed position as the patient bed 218 is moved beneath the PET imaging modality 212.

The computer 230 generates a set of virtual LORs from the CBM PET data. Each count of the virtual LORs of a sinogram is an integration of counts acquired on real LORs that slide through the virtual LORs during CBM imaging. In some embodiments, different virtual LORs in a CBM sinogram will have different gating windows. Because different virtual LORs may have different gating windows, a simple scaling factor does not account for gating effects on reconstructions.

In order to compensate for gating effects on image uniformity and quantification, gating signals are recorded simultaneously with the CBM PET data. The gating signals allow the CBM PET data to be filtered such that only portions of the data captured during specific phases of the gate cycle are used to generate an image. For example, in some embodiments, the CBM PET data is filtered such that only data acquired at a maximum and/or a minimum of the cycle is used to generate an image.

FIGS. 3A-3C illustrate potential gating scenarios that can be implemented by the imaging system 200. FIG. 3A illustrates one embodiment of a cardiac gating profile 300a. The cardiac gating profile 300a includes a plurality of gates 302a regularly spaced. FIG. 3B illustrates one embodiment of a respiratory gating profile 300b. The respiratory gating profile 300b includes a plurality of gates 302b irregularly spaced. Although the respiratory gating profile 300b includes a regular respiratory waveform 304, it will be recognized that respiratory waveforms may be irregular waveforms. In some embodiments, gating is limited only to portions of the body commonly subject to motion during scans. For example, FIG. 3C illustrates one embodiment of a stitched chest gating profile 300c having gating only over the chest and abdomen to correct for a respiratory waveform 304. As shown in FIG. 3C, gating 302c is applied during the portion of the scan 306 corresponding to the chest and abdomen of a patient.

Figure 4:
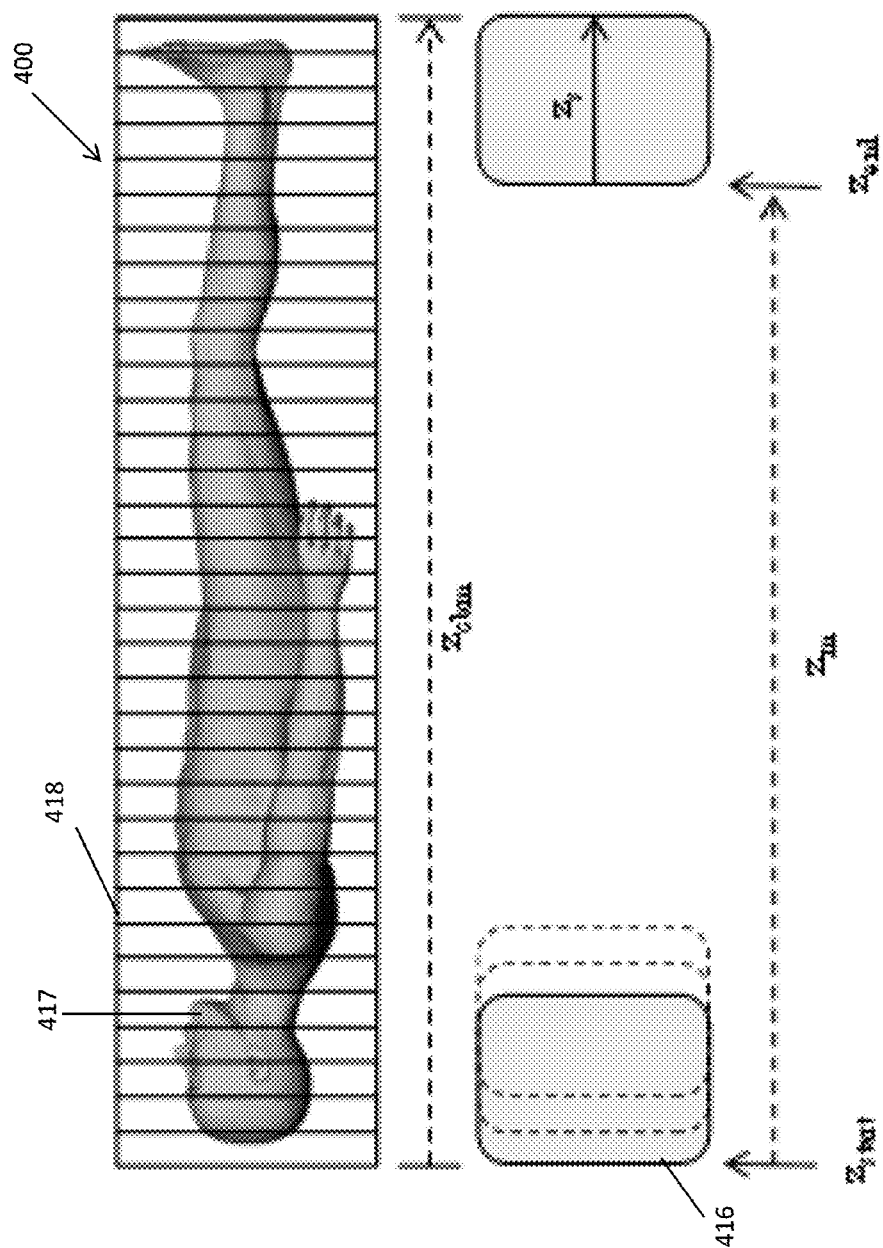
FIG. 4 illustrates one embodiment of a PET imaging apparatus positioned with respect to a patient on a patient bed.

FIG. 4 illustrates one embodiment of a PET imaging system 400 including a PET gantry 416 positioned with respect to a patient 417 on a patient bed 418. In some embodiments, the gantry 416 moves continuously from an initial position from $z_{start}$ to an end position $z_{end}$. In some embodiments, the gantry 416 is stationary and the patient bed 418 moves continuously through the gantry from the initial position $z_{start}$ to the end position $z_{end}$. In some embodiments, $z_{start}$ corresponds to the head of the patient bed 418 and $z_{end}$ corresponds to a foot of the patient bed 418. In some embodiments, $z_{start}$ and/or $z_{end}$ may correspond to any relative position of the patient bed 418 with respect to the gantry 416. The gantry 416 moves in increments of $\Delta z$. In some embodiments, $\Delta z$ is the slice thickness for a reconstruction grid. The bed 418 moves at a speed of $v(z_m)$ at position $z_m$. The time, T, for the gantry 416 to move from position $z_{start}$ to position $z_m$ can be represented by the equation:

$$T = \sum_{z'=z_{start}}^{z_m} \frac{\Delta z}{v(z')}$$

wherein $v(z')$ is the speed of the gantry 416 at position $z'$. The time window during which the bed moves from position $z_m$ to position $z_{m+1}$ (e.g., moves by one slice thickness) can be calculated as:

$$t_m = \sum_{z'=z_{start}}^{z_m} \frac{\Delta z}{v(z')}, \sum_{z'=z_{start}}^{z_m} \frac{\Delta z}{v(z')} + \frac{\Delta z}{v(z_m)}$$

In some embodiments, the time in the time window $t_m$ that the gantry 416 acquires data can be calculated by the equation:

$$\sum_{i=0}^{n-1} g_i \cap t_m$$

where $g_i$ is a gating window of the CBM data. The intersection between $t_m$ and $g_i$ determines the time in $t_m$ that the scanner acquires data. FIGS. 5A-5D illustrate various embodiments of a gating window intersecting a time window $t_m$. In the illustrated embodiments, the time window $t_m$ is defined as $[t_s, t_e]$ and the gating window is defined as $[g_s, g_e]$. FIG. 5A illustrates an embodiment in which the gating window 502a start time $g_s$ is earlier than the time window 504a start time $t_s$ and the gating window 502a end time $g_e$ is earlier than the time window 504a end time $t_e$. FIG. 5B illustrates an embodiment in which the gating window 502b start time $g_s$ is later than the time window 504b start time $t_s$ and the gating window 502b end time $g_e$ is earlier than the time window 504b end time $t_e$. FIG. 5C illustrates an embodiment in which the gating window 502c start time $g_s$ is later than the time window 504c start time $t_s$ and the gating window 502c end time $g_e$ is later than the time window 504c end time $t_e$. FIG. 5D illustrates an embodiment in which the gating window 502d start time $g_s$ is earlier than the time window 504d start time $t_s$ and the gating window 502d end time $g_e$ is later than the time window 504d end time $t_e$. The four embodiments shown in FIGS. 5A-5D can be represented as:

$$\begin{cases} g_e - t_s, & g_s < t_s, g_e < t_e \\ g_e - g_s, & t_s < g_s, g_e < t_e \\ t_e - g_s, & t_s < g_s, t_e < g_e \\ t_e - t_s, & g_s < t_s, t_e < g_e \\ 0 & \text{otherwise} \end{cases}$$

The imaging system 400 iterates between each gating window 502a-502d to calculate the time that the gantry 416 acquires data.

In some embodiments, a plurality of gating windows $g_i$ (i=0 . . . , n-1) are selected, where n is the total number of gating windows in the CBM data. The slice index in a scanner sinogram segment can be represented by $z_s$, and the slice index in a CBM sinogram segment can be represented by $z_{cbm}$. The efficiency of each virtual LOR can be calculated according to the equation:

$$\varepsilon_{cbm}(\rho, \theta, z_{cbm}, z_{start}, z_{end}) = \sum_{z_m=z_{start}}^{z_{end}} \left( \left( \sum_{i=0}^{n-1} g_i \cap t(z_m) \right) \varepsilon_{scanner}(\rho, \theta, z_s, z_m) e^{-\frac{\ln 2}{\lambda}T} \delta(z_m + z_s, z_{cbm}) \right)$$

where $\varepsilon_{scanner}(\rho, \theta, z_s, z_m)$ represent efficiency of a virtual LOR defined by $(\rho, \theta, z_s)$ when the scanner is at position $z_m$. The scanner efficiency $\varepsilon_{scanner}(\rho, \theta, z_s, z_m)$ accounts for geometrical components, crystal efficiency, crystal interference pattern, and detector dead time effects. The function $\delta(z_m+z_s, z_{cbm})$ maps the real LORs in scanner space to the virtual LORs in the CBM space. The equation $$e^{-\frac{\ln 2}{\lambda}T}$$

accounts for the decay correction with respect to the time when the gantry 416 is at the initial position $z_{start}$, where $\lambda$ is the isotope half-life.

After $\varepsilon_{cbm}(\rho, \theta, z_{cbm}, z_{start}, z_{end})$ is calculated, the normalization matrix $N(\rho, \theta, z_{cbm}, z_{start}, z_{end})$ is calculated as the inverse of $\varepsilon_{cbm}(\rho, \theta, z_{cbm}, z_{start}, z_{end})$:

$$N(\rho, \theta, z_{cbm}, z_{start}, z_{end}) = 1/\varepsilon_{cbm}(\rho, \theta, z_{cbm}, z_{start}, z_{end})$$

The normalization matrix N can be used to reconstruct one or more images from the CBM PET data, such as, for example, by using the normalization matrix in an ordinary Poisson ordered subset expectation-maximization (OP-OSEM) equation.

Figure 6:
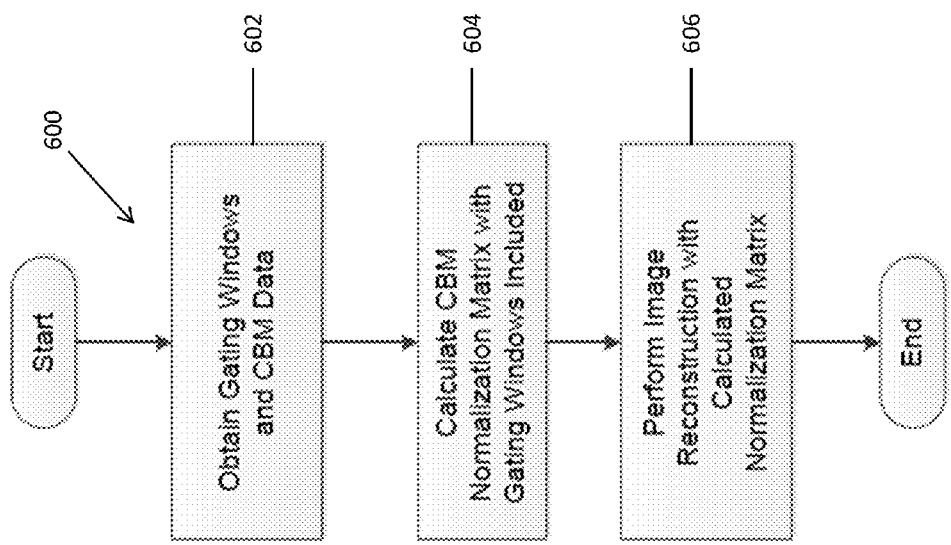
FIG. 6 illustrates one embodiment of a method for gated reconstruction of CBM imaging data.
Figure 7:
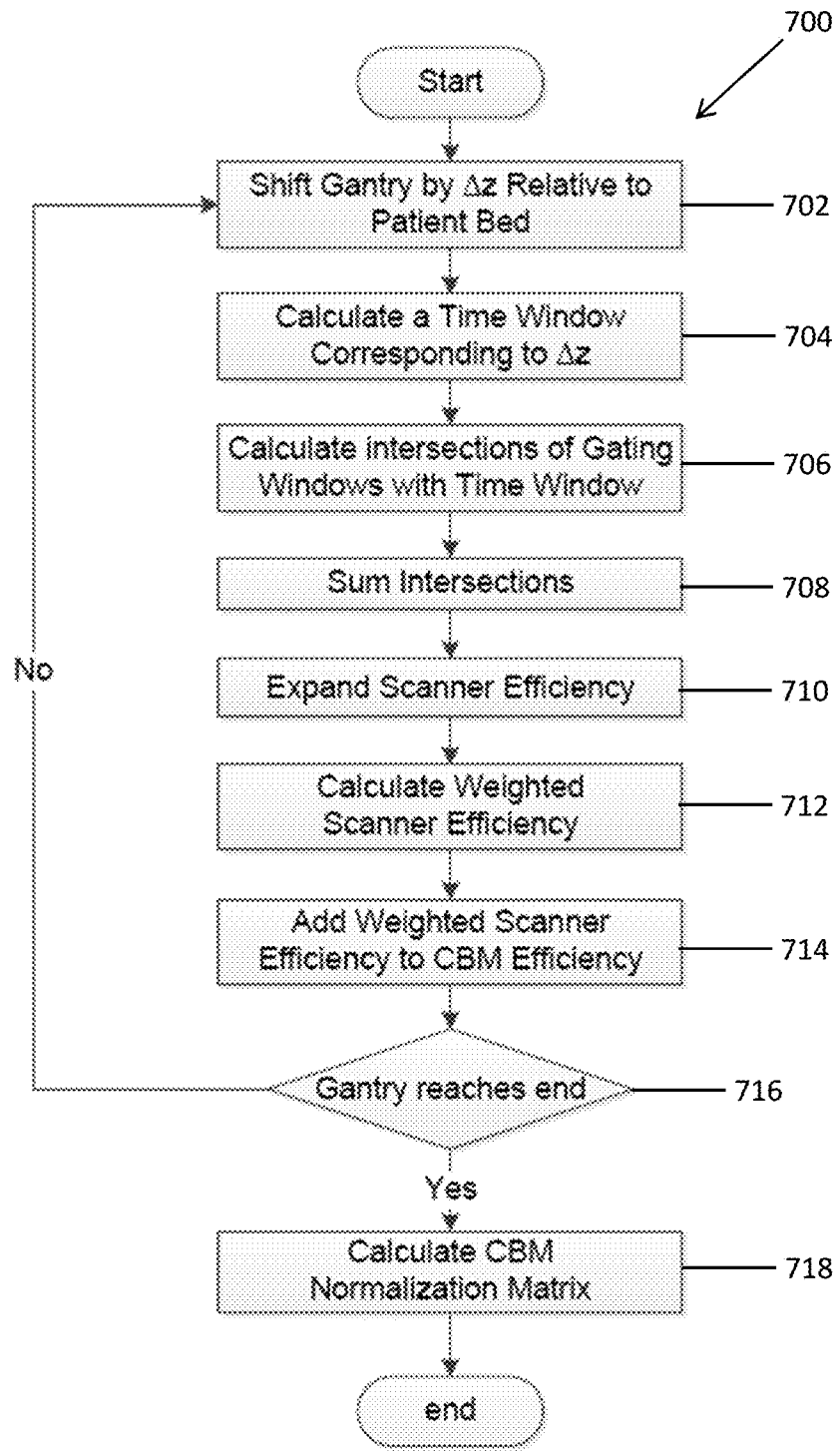
FIG. 7 illustrates one embodiment of a method for generating a CBM normalization matrix used in the gated reconstruction method of FIG. 6.

FIG. 6 illustrates one embodiment of a method 600 of gated reconstruction for CBM data. The method 600 may be executed by any suitable system, such as, for example, the computer system 230 illustrated in FIG. 2. In a first step 602, CBM data and gating windows for the CBM data is acquired. In some embodiments, the CBM data includes PET data. The gating windows may be recorded simultaneously with the CBM data acquisition and/or determined subsequent to the data acquisition through histogramming of the CBM data. In a second step 604, a CBM normalization matrix is calculated. The CBM normalization matrix calculation includes the gating windows recorded in the first step 602. FIG. 7 illustrates one embodiment of a method 700 for calculating the CBM normalization matrix. After the CBM normalization matrix is calculated in the second step 604, image reconstruction is performed in a third step 606. The image reconstruction is performed using the normalization matrix calculated in the second step 604.

FIG. 7 illustrates one embodiment of a method 700 for calculating a CBM normalization matrix. In a first step 702, the gantry 416 is shifted a predetermined distance, $\Delta z$, relative to the patient bed 418. Although the method 700 is described in conjunction with a moveable gantry 416, it will be recognized that in some embodiments the gantry 416 is stationary and the patient bed 418 is moved relative to the gantry 416. Furthermore, it will be recognized that one or more stationary images may be obtained by the gantry 416 prior to the first step 702. In a second step 704, a time window is calculated for the corresponding space shift, $\Delta z$, of the gantry 416. The calculation may be performed, for example, according to the equation:

$$t_m = \sum_{z'=z_{start}}^{z_m} \frac{\Delta z}{v(z')}, \sum_{z'=z_{start}}^{z_m} \frac{\Delta z}{v(z')} + \frac{\Delta z}{v(z_m)}$$

The intersections of the gating windows with the time windows are calculated in a third step 706 and summed together in a fourth step 708. In some embodiments, the intersections are calculated according to the equation:

$$\sum_{i=0}^{n-1} g_i \cap t_m$$

In a fifth step 710, an expanded scanner efficiency is generated. The expanded scanner efficiency is multiplied with the summed intersections of the gating windows and time windows to generate a weighted scanner efficiency in a sixth step 712. In a seventh step 714, the weighted scanner efficiency is summed to generate a CBM virtual scanner efficiency. After the virtual CBM scanner efficiency is calculated, a CBM normalization matrix entry is generated in a ninth step 718. For example, in some embodiments, the CBM normalization matrix entry is generated according to the equation:

$$N(\rho,\theta,z_{cbm},z_{start},z_{end}) = 1/\epsilon_{cbm}(\rho,\theta,z_{cbm},z_{start},z_{end})$$

In an eighth step 716, the method 700 checks if the gantry 416 has reached an end point. If the gantry 416 has not reached an end point, the method 700 returns to the first step 702 and calculates subsequent CBM normalization matrix entries until the gantry 416 reaches an end point. Although the steps of the method 700 are discussed as discrete steps 702-718, it will be appreciated that one or more of the steps 702-718 can be combined into a single step.

Figure 8C:
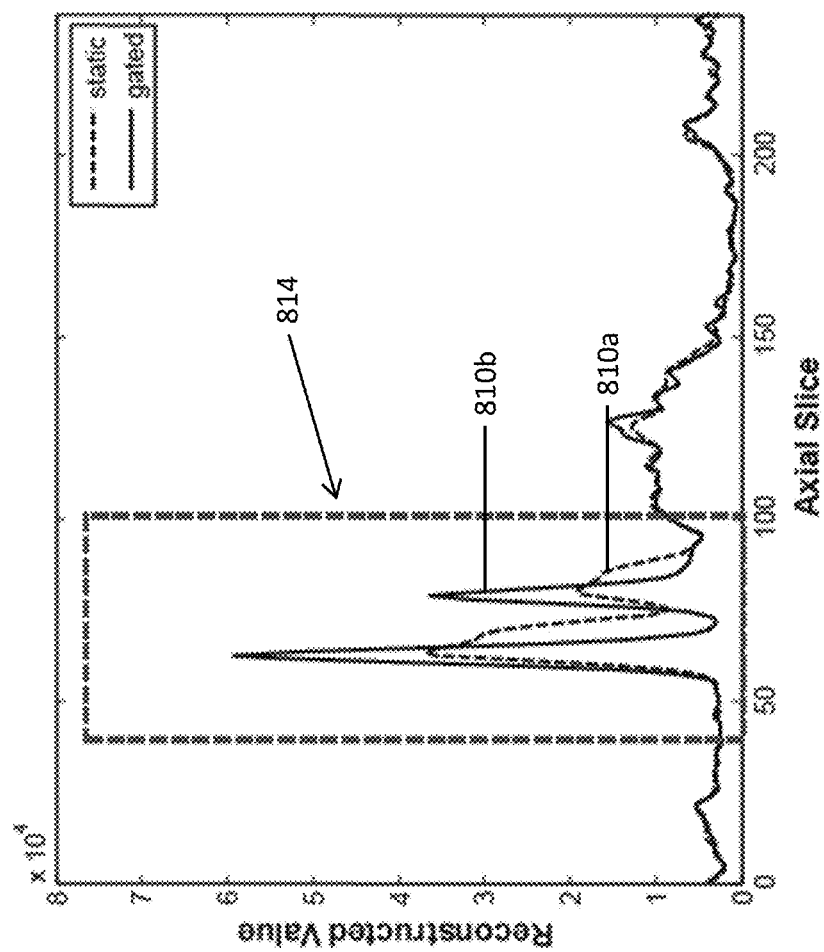
FIG. 8C is a chart illustrating one embodiment of axial line profiles for the static reconstructed image of FIG. 8A and the gated reconstructed image of FIG. 8B.

In some embodiments, gating signals comprise respiratory gating signals, for example, as illustrated in FIG. 3B. The gating signals are used to reconstruct an area of a scan including a movement profile during data collection. For example, in some embodiments a CBM PET whole body scan is performed on a patient. FIG. 8A illustrates one embodiment of a static reconstructed image 800*a* generated using 100% of counts in a set of CBM data generated during the CBM scan. As can be seen in FIG. 8A, the static reconstructed image 800*a* has a blurred, elongated tumor 802*a* shown in a lung. The tumor 802*a* is blurred because of respiratory motion during data acquisition. In contrast, FIG. 8B illustrates one embodiment of a gated reconstructed image 800*b*. The gated reconstructed image was generated according to the methods disclosed herein. The gated reconstructed image 800*b* utilizes 35% of the total counts in the set of CBM data. The gated sinogram 800*b* is nosier than the static sinogram 800*a*, but the tumor 802*b* is clearer, as the gated reconstruction 800*b* accurately compensates for the respiratory motion in the virtual LORs of the CBM data. FIG. 8C illustrates one embodiment of axial line profiles 810*a*, 810*b* for the static sinogram 800*a* and the gated sinogram 800*b*, respectively. The axial line profiles 810*a*, 810*b* are for a 5 pixel width 812 running through the tumor 802. As shown in FIG. 8C, while the axial line profiles of the static reconstruction 810*a* and the gated reconstruction 810*b* substantially agree in the area 814 of the tumor 802, the tumor 802*b* is better delineated in the gated reconstruction 810*b* than in the static reconstruction 810*a*.

Figure 9:
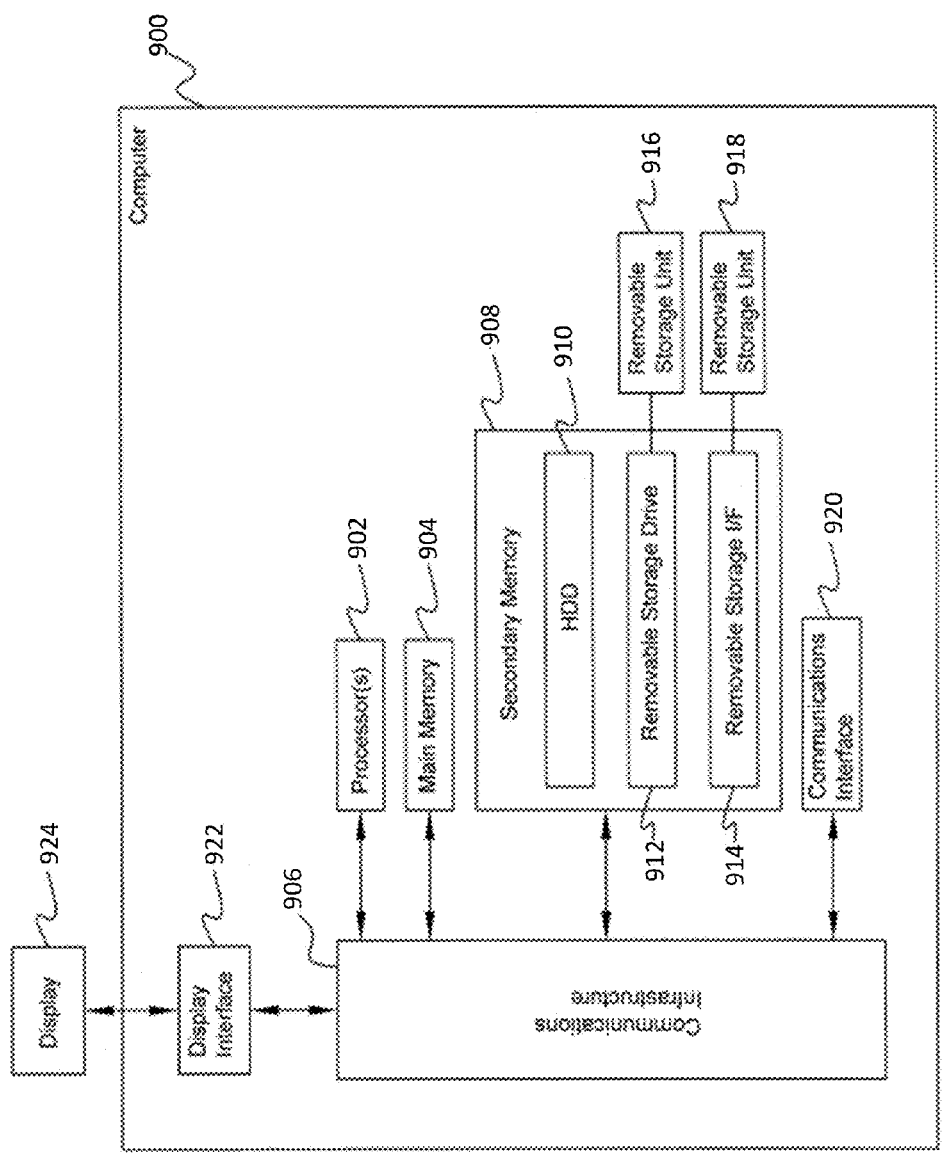
FIG. 9 illustrates one embodiment of a computer system configured to implement one or more steps of the methods described herein.

FIG. 9 is an architecture diagram of a computer 900 that may be used in some embodiments, e.g., for implementing computer 230 shown in FIG. 2. Computer system 900 may include one or more processors 902. Each processor 902 is connected to a communication infrastructure 906 (e.g., a communications bus, cross-over bar, or network). Computer system 900 may include a display interface 922 that forwards graphics, text, and other data from the communication infrastructure 906 (or from a frame buffer, not shown) for display on the display unit 924 to a user.

Computer system 900 may also include a main memory 904, such as a random access memory (RAM), and a secondary memory 908. The main memory 904 and/or the secondary memory 908 comprise non-transitory memory. The secondary memory 908 may include, for example, a hard disk drive (HDD) 910 and/or removable storage drive 912, which may represent a floppy disk drive, a magnetic tape drive, an optical disk drive, a memory stick, or the like as is known in the art. The removable storage drive 912 reads from and/or writes to a removable storage unit 916. Removable storage unit 916 may be a floppy disk, magnetic tape, optical disk, or the like. As will be understood, the removable storage unit 916 may include a computer readable storage medium having tangibly stored therein (embodied thereon) data and/or computer software instructions, e.g., for causing the processor(s) to perform various operations.

In alternative embodiments, secondary memory 908 may include other similar devices for allowing computer programs or other instructions to be loaded into computer system 900. Secondary memory 908 may include a removable storage unit 918 and a corresponding removable storage interface 914, which may be similar to removable storage drive 912, with its own removable storage unit 916. Examples of such removable storage units include, but are not limited to, USB or flash drives, which allow software and data to be transferred from the removable storage unit 916, 918 to computer system 900.

Computer system 900 may also include a communications interface (e.g., networking interface) 920. Communications interface 920 allows software and data to be transferred between computer system 900 and external devices. Examples of communications interface 920 may include a modem, Ethernet card, wireless network card, a Personal Computer Memory Card International Association (PCM-CIA) slot and card, or the like. Software and data transferred via communications interface 920 may be in the form of signals, which may be electronic, electromagnetic, optical, or the like that are capable of being received by communications interface 920. These signals may be provided to communications interface 920 via a communications path (e.g., channel), which may be implemented using wire, cable, fiber optics, a telephone line, a cellular link, a radio frequency (RF) link and other communication channels.

It is understood by those familiar with the art that techniques described herein may be implemented in hardware, firmware, or software encoded (e.g., as instructions executable by a processor) on a non-transitory computer-readable storage medium.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein may be applied to other embodiments without the use of inventive faculty. The present disclosure is not intended to be limited to the embodiments shown herein, but is to be accorded the widest scope consistent with the principles and novel features disclosed herein.

What is claimed is:

1. A method for processing data for medical imaging, the method comprising:
    obtaining a set of continuous bed motion (CBM) data from a first imaging modality, wherein the set of CBM data includes a plurality of gating signals;
    calculating a CBM normalization matrix using the plurality of gating signals; and
    reconstructing an image from the CBM data and the CBM normalization matrix,
    wherein calculating the CBM normalization matrix comprises:
    calculating a plurality of time windows;
    calculating a plurality of intersections between the plurality of gating signals and the plurality of time windows;
    calculating a weighted scanner efficiency using the plurality of intersections;
    calculating a CBM efficiency by summing the weighted scanner efficiency; and
    generating a CBM normalization matrix value from the CBM efficiency.

2. The method of claim 1, wherein calculating the weighted scanner norm comprises:
    summing the plurality of intersections; and
    multiplying the sum of the plurality of intersections and an expanded scanner norm.

3. The method of claim 1, wherein generating the CBM normalization matrix value comprises taking the inverse of the CBM efficiency.

4. The method of claim 1, wherein the plurality of time windows, $t_m$, are calculated according to the equation:

$$t_m = \sum_{z'=z_{start}}^{z_m} \frac{\Delta z}{v(z')}, \sum_{z'=z_{start}}^{z_m} \frac{\Delta z}{v(z')} + \frac{\Delta z}{v(z_m)}$$

where $z_m$ is a current bed position in the CBM data, $z_{start}$ is an initial bed position in the CBM data, and v(z) is a speed of a bed in the CBM data.

5. The method of claim 1, wherein the plurality of intersections are calculated according to the equation:

$$\sum_{i=0}^{n-1} g_i \cap t_m$$

where $g_i$ is a gating window and $t_m$ is a timing window.

6. The method of claim 5, wherein each of the plurality of intersections has a relationship between $g_i$ and $t_m$ selected from:

$$\begin{cases} g_e - t_s, & g_s < t_s, g_e < t_e \\ g_e - g_s, & t_s < g_s, g_e < t_e \\ t_e - g_s, & t_s < g_s, t_e < g_e \\ t_e - t_s, & g_s < t_s, t_e < g_e \end{cases}$$

where $g_s$ is a starting position of the gating window $g_i$, $g_e$ is an end position of the gating window $g_i$, $t_s$ is a starting position of the timing window $t_m$, and $t_e$ is an end position of the timing window $t_m$.

7. The method of claim 1, wherein the normalization matrix, N, is calculated according to the equation:

$$N(\rho, \theta, z_{cbm}, z_{start}, z_{end}) = 1/\epsilon_{cbm}(\rho, \theta, z_{cbm}, z_{start}, z_{end})$$

where $z_m$ is a current bed position in the CBM data, $z_{start}$ is an initial bed position in the CBM data, $z_{end}$ is a final bed position in the CBM data, $\epsilon_{cbm}$ is the efficiency of a virtual line of response in the CBM data.

8. The method of claim 7, wherein the efficiency of the virtual line of response is calculated according to the equation:

$$\varepsilon_{cbm}(\rho, \theta, z_{cbm}, z_{start}, z_{end}) = \sum_{z_m=z_{start}}^{z_{end}} \left( \left( \sum_{i=0}^{n-1} g_i \cap t(z_m) \right) \varepsilon_{scanner}(\rho, \theta, z_s, z_m) e^{-\frac{\ln 2}{\lambda}T} \delta(z_m + z_s, z_{cbm}) \right)$$

where $\epsilon_{scanner}$ is the efficiency of a real line of response defined at position $z_m$,
    $\delta(z_m+z_s,z_{cbm})$ maps one or more real lines of response in scanner space to one or more virtual lines of response in CBM space, $\lambda$ is an isotope half-life and T is the time to move from a position $z_{start}$ to a position $z_m$.

9. A non-transitory computer readable medium storing instructions configured to cause a computer system to execute the steps of:
    obtaining a set of continuous bed motion (CBM) data including a plurality of gating signals, wherein the set of continuous bed motion data is obtained by a first imaging modality of an imaging system;
    calculating a CBM normalization matrix using the plurality of gating signals; and
    reconstructing an image from the CBM data and the CBM normalization matrix,
    wherein calculating the CBM normalization matrix comprises:
    calculating a plurality of time windows;
    calculating a plurality of intersections between the plurality of gating signals and the plurality of time windows;
    calculating a weighted scanner efficiency using the plurality of intersections;
    calculating a CBM efficiency by summing the weighted scanner efficiency; and
    generating a normalization matrix value by taking the inverse of the CBM efficiency.

10. The non-transitory computer readable medium of claim 9, wherein calculating the weighted scanner efficiency comprises:
    summing the plurality of intersections; and
    multiplying the sum of the plurality of intersections and an expanded scanner efficiency.

11. The non-transitory computer readable medium of claim 9, wherein the plurality of time windows, $t_m$, are calculated according to the equation:

$$t_m = \sum_{z'=z_{start}}^{z_m} \frac{\Delta z}{v(z')}, \sum_{z'=z_{start}}^{z_m} \frac{\Delta z}{v(z')} + \frac{\Delta z}{v(z_m)}$$

where $z_m$ is a current bed position in the CBM data, $z_{start}$ is an initial bed position in the CBM data, and v(z) is a speed of a bed in the CBM data.

12. The non-transitory computer readable medium of claim 9, wherein the plurality of intersections are calculated according to the equation:

$$\sum_{i=0}^{n-1} g_i \cap t_m$$

where $g_i$ is a gating window and $t_m$ is a timing window.

13. The non-transitory computer readable medium of claim 12, wherein each of the plurality of intersections has a relationship between $g_i$ and $t_m$ selected from:

$$\begin{cases} g_e - t_s, & g_s < t_s, g_e < t_e \\ g_e - g_s, & t_s < g_s, g_e < t_e \\ t_e - g_s, & t_s < g_s, t_e < g_e \\ t_e - t_s, & g_s < t_s, t_e < g_e \end{cases}$$

where $g_s$ is a starting position of the gating window $g_i$, $g_e$ is an end position of the gating window $g_i$, $t_s$ is a starting position of the timing window $t_m$, and $t_e$ is an end position of the timing window $t_m$.

14. The non-transitory computer readable medium of claim 12, wherein the normalization matrix, N, is calculated according to the equation:

$$N(\rho,\theta,z_{cbm},z_{start},z_{end}) = 1/\epsilon_{cbm}(\rho,\theta,z_{cbm},z_{start},z_{end})$$

where $\epsilon_{cbm}$ is the efficiency of a virtual line of response in the CBM data.

15. The non-transitory computer readable medium of claim 14, wherein the efficiency of the virtual line of response is calculated according to the equation:

$$\varepsilon_{cbm}(\rho, \theta, z_{cbm}, z_{start}, z_{end}) = \sum_{z_m=z_{start}}^{z_{end}} \left( \left( \sum_{i=0}^{n-1} g_i \cap t(z_m) \right) \varepsilon_{scanner}(\rho, \theta, z_s, z_m) e^{-\frac{\ln 2}{\lambda}T} \delta(z_m + z_s, z_{cbm}) \right)$$

where $\epsilon_{scanner}$ is the efficiency of a real line of response defined at position $z_m$, $\delta(z_m+z_s, z_{cbm})$ maps one or more real lines of response in scanner space to one or more virtual lines of response in CBM space, $\lambda$ is an isotope half-life, and T is the time to move from a position $z_{start}$ to a position $z_m$.

16. A system comprising:

a first imaging modality; and a computer, wherein the computer is configured to execute the steps of:

receiving a set of continuous bed motion (CBM) data including a plurality of gating signals from the first imaging modality;

calculating a CBM normalization matrix using the plurality of gating signals; and reconstructing an image from the CBM data and the CBM normalization matrix, wherein calculating the CBM normalization matrix comprises:

calculating a plurality of time windows;

calculating a plurality of intersections between the gating signals and the time windows;

calculating a weighted scanner efficiency using the plurality of intersections, wherein the weighted scanner efficiency is calculated by:

summing the plurality of intersections; and multiplying the sum of the plurality of intersections and an expanded scanner efficiency;

calculating a CBM efficiency by summing the weighted scanner efficiency; and generating a CBM normalization matrix value by taking the inverse of the CBM efficiency.

\* \* \* \* \*